(12) United States Patent
Pancras et al.

(10) Patent No.: US 11,277,351 B2
(45) Date of Patent: Mar. 15, 2022

(54) PRIORITY-BASED QUEUEING FOR SCALABLE DEVICE COMMUNICATION

(71) Applicant: ARRIS Enterprises LLC, Suwanee, GA (US)

(72) Inventors: Siby Mathew Tarigopla Pancras, San Jose, CA (US); Karthik Ranganathan, Bangalore (IN); Dinesh Raman, Fremont, CA (US); Jari T. Malinen, Santa Clara, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/598,542

(22) Filed: Oct. 10, 2019

(65) Prior Publication Data
US 2020/0177517 A1    Jun. 4, 2020

Related U.S. Application Data

(63) Continuation-in-part of application No. 16/185,002, filed on Nov. 8, 2018, now Pat. No. 10,582,394.

(51) Int. Cl.
*H04L 12/863* (2013.01)
*H04L 47/6295* (2022.01)
(Continued)

(52) U.S. Cl.
CPC ...... *H04L 47/6295* (2013.01); *H04L 47/6215* (2013.01); *H04W 4/70* (2018.02); *H04W 4/80* (2018.02)

(58) Field of Classification Search
CPC ............. H04L 47/2408; H04L 47/2416; H04L 47/2433; H04L 47/2475; H04L 47/6215;
(Continued)

(56) References Cited

U.S. PATENT DOCUMENTS 5,712,624 A    1/1998  Ayerst
8,184,540 B1 *  5/2012  Perla ................... H04L 47/568
                                                370/235
(Continued)

FOREIGN PATENT DOCUMENTS

EP          3211937 A1    8/2017
KR    1020150039510 A    10/2015

OTHER PUBLICATIONS

Extended European Search Report, RE: Application No. 18206547.4, dated Jan. 15, 2019.
(Continued)

*Primary Examiner* — Magdi Elhag
(74) *Attorney, Agent, or Firm* — Steven Stupp; Stewart Wiener

(57) ABSTRACT

An electronic device (such as an access point or an eNodeB) that selectively provides prioritized communication is described. During operation, the electronic device may receive one or more packets or frames from a second electronic device using a communication protocol. Then, the electronic device may determine device-specific information based at least in part on a device profile associated with the communication protocol and/or a communication history of the second electronic device. Next, based on the determined device-specific information, the electronic device may assign additional data traffic associated with the second electronic device to a queue in a set of queues, where queues in the set of queues have different priorities, and where the queue provides a predefined latency of communication with the second electronic device corresponding to a priority of the queue.

20 Claims, 10 Drawing Sheets

(51) Int. Cl.
  *H04L 47/62* (2022.01)
  *H04W 4/80* (2018.01)
  *H04W 4/70* (2018.01)
(58) Field of Classification Search
  CPC ............. H04L 47/6275; H04L 47/6295; H04L 47/562; H04L 47/564; H04L 69/18; H04W 4/70; H04W 4/80; H04W 48/16; H04W 16/14; H04W 72/0453
  See application file for complete search history.

(56) References Cited

U.S. PATENT DOCUMENTS

| | | | |
|---|---|---|---|
| 8,411,692 B2 | 4/2013 | Patil | |
| 8,732,031 B2 | 5/2014 | Martin et al. | |
| 8,775,669 B2 | 7/2014 | Hutchinson | |
| 8,875,154 B2 | 10/2014 | Bhatia | |
| 9,407,573 B2 | 8/2016 | Horvath | |
| 9,577,773 B2 | 2/2017 | Solondz | |
| 9,924,424 B2 | 3/2018 | Chuberre | |
| 9,949,169 B2 | 4/2018 | Yerramalli | |
| 10,078,865 B2 | 9/2018 | Joshi et al. | |
| 10,582,394 B2* | 3/2020 | Narayanan | H04W 48/18 |
| 2002/0021701 A1 | 2/2002 | Lavian et al. | |
| 2003/0189943 A1* | 10/2003 | Gorti | H04L 47/56 370/412 |
| 2007/0064699 A1* | 3/2007 | Bernick | H04L 47/56 370/392 |
| 2008/0159208 A1 | 7/2008 | Kloker | |
| 2011/0267951 A1* | 11/2011 | Stanwood | H04W 28/02 370/235 |
| 2012/0106447 A1* | 5/2012 | Yousefi | B60R 16/0315 370/328 |
| 2012/0270599 A1 | 10/2012 | Mori | |
| 2012/0327778 A1* | 12/2012 | Stanwood | H04W 72/1242 370/237 |
| 2013/0285835 A1* | 10/2013 | Kim | G01D 4/002 340/870.02 |
| 2015/0146656 A1 | 5/2015 | Sun et al. | |
| 2016/0255009 A1* | 9/2016 | Ramaiah | H04L 47/27 370/235 |
| 2016/0286251 A1 | 9/2016 | Kopka | |
| 2016/0301614 A1* | 10/2016 | Concer | H04L 47/6215 |
| 2016/0366689 A1 | 12/2016 | Zhang | |
| 2017/0041859 A1 | 2/2017 | Martin et al. | |
| 2017/0126873 A1 | 5/2017 | McGary | |
| 2017/0202015 A1 | 7/2017 | Li et al. | |
| 2017/0245133 A1* | 8/2017 | Fontaine | H04L 12/2814 |
| 2017/0295587 A1* | 10/2017 | Lam | H04L 5/0055 |
| 2017/0311171 A1 | 10/2017 | Kurian et al. | |
| 2018/0167825 A1 | 6/2018 | Egner | |
| 2018/0184330 A1 | 6/2018 | Egner | |
| 2018/0206282 A1 | 7/2018 | Singh | |
| 2018/0302118 A1 | 10/2018 | Lim | |
| 2020/0053190 A1* | 2/2020 | Uddin | H04L 41/00 |

OTHER PUBLICATIONS

European Patent Appl. No. 18206547.4, Office Action, dated Feb. 10, 2020.
PCT Patent Application Serial No. PCT/2020/054672, International Search Report and Written Opinion, dated Dec. 30, 2020.

* cited by examiner

PRIORITY-BASED QUEUEING FOR SCALABLE DEVICE COMMUNICATION

CROSS REFERENCE TO RELATED APPLICATIONS

This application is a continuation-in-part under 35 U.S.C. § 120 of U.S. Non-Provisional application Ser. No. 16/185,002, entitled "Flexible Gateway for Heterogeneous-Device Management," by Dileepan Narayanan, et al., filed on Nov. 8, 2018, which claims priority under 35 U.S.C. § 119(e) to U.S. Provisional Application Ser. No. 62/586,885, entitled "Flexible Gateway for Heterogeneous-Device Management," by Dileepan Narayanan, et al., filed on Nov. 15, 2017, the contents of both of which are herein incorporated by reference.

BACKGROUND

Field

The described embodiments relate to techniques for communicating information among electronic devices. Notably, the described embodiments relate to techniques for facilitating an Internet-of-things (IoT) system with scalable communication based on priority queueing of traffic.

Related Art

The increasing capabilities of electronic devices are dramatically changing our lives. For example, the processing and communication capabilities of portable electronic devices, such as cellular telephones, provide users with the capabilities of a handheld computer. In conjunction with expanded networks, such as the cellular-telephone networks and the Internet, these capabilities are allowing individuals to: access vast amounts of information; identify and interact with other people, organizations and governments; access information at arbitrary locations; and/or perform a wide variety of tasks. Collectively, these technologies have resulted in a significant increase in economic activity (such as online financial transactions, which are sometimes referred to as 'ecommerce') and productivity, and enable a host of applications that enhance user experiences and quality of life.

Recently, it has been proposed that further advances can be achieved by enhancing the capabilities of other electronic devices, which are pervasive but largely ignored by most users (such as in appliances, infrastructure, transportation, farming, etc.). Notably, by embedding sensors, actuators and communication capabilities in these 'background' electronic devices, the so-called 'Internet of things' (IoT) can provide a distributed network that facilities the exchange of data, remote sensing and control, and a diverse set of applications that facilitate more direct integration of the physical world into computer-based systems. In principle, the IoT offers the promise of highly automated systems that improve efficiency, enhance accuracy and expand economic activity in a diverse set of markets, such as: smart cities, hospitality, retail, education, housing, and manufacturing.

In practice, there are still obstacles to achieving the goals of the IoT. Notably, the IoT marketplace is diverse, with competing commercial entities offering devices/endpoints, networks, middleware and cloud-based platforms and services. Moreover, the marketplace lacks interoperability standards, which restricts communication and the exchange of data among components in these systems. The resulting lack of coordination can make it difficult to scale IoT systems while maintaining or ensuring quality of service.

Consequently, the IoT remains fragmented and siloed, which forces users to purchase additional dedicated equipment (such as separate gateways for electronic devices from different manufacturers and providers, and/or additional network switches to connect to different cloud-based service providers) in an attempt to build integrated solutions. However, these efforts often result in custom and expensive solutions with redundant equipment and limited flexibility, all of which is frustrating to users and limits market traction of the IoT.

SUMMARY

An electronic device that selectively provides prioritized communication is described. This electronic device includes one or more antenna nodes that can couple to one or more antennas. Moreover, the electronic device includes an interface circuit, where the interface circuit is communicatively coupled to the one or more antenna nodes. During operation, the interface circuit may receive, from the interface circuit, one or more packets or frames associated with a second electronic device using a communication protocol. Then, the electronic device may determine device-specific information based at least in part on a device profile associated with the communication protocol (such as an attribute or characteristic of the second electronic device) and/or a communication history of the second electronic device. Next, based on the determined device-specific information, the electronic device may assign additional data traffic associated with the second electronic device to a queue in a set of queues, where queues in the set of queues have different priorities, and where the queue provides a predefined latency of communication with the second electronic device corresponding to a priority of the queue.

Note that the device-specific information may include: a type of the second electronic device, a type of service associated with the second electronic device, whether the second electronic device is battery powered and/or whether the second electronic device has a wake-up time interval. Alternatively or additionally, the device-specific information may include or may specify a priority associated with data traffic to and/or from the second electronic device.

In some embodiments, priorities of the set of queues may be based at least in part on a large variety of classifications, including an importance of an application. For example, a panic-button application message may have higher priority than other control messages, or, a set of entities, such as tags or premium users, may have messages belonging to a premium category in which the messages are prioritized over messages of other categories. Moreover, priorities of the set of queues may be based at least in part on traffic categorization, in which messages belonging to a connection-oriented applications (e.g., an application that establishes a connection with an electronic device to pass a message) have higher priority than messages belonging to a connectionless applications (e.g., reception of redundant beacon messages from BLE tag devices). Furthermore, priorities of the set of queues may be based at least in part on a timeliness requirement of messages, in which messages belonging to a low-latency category are prioritized over messages of other categories. Additionally, priorities of the set of queues may be based at least in part on a relative weighed categorization of multiple priority classes, in which a priority class (such as a message type of a panic-button pressed message) have a much higher weight than another categorization. For example, a timeliness requirement of low latency may have a higher priority that non-low latency messaging. Note that priorities of the set of queues may be based at least in part on analytics information, such as a past history of messages. Notably, if a past instance of a particular message has failed to gain priority for a longer time than a certain threshold (such as 1-30 s), then based at least in part on analysis of a message history (such as using one or more statistical metrics), the priority can be raised as a result of or in order to address the previous failures. The priorities of the set of queues may be based at least in part on performance conditions of a message passing system. For example, if the message passing system is under a heavy load condition, messages of an administrative type can be elevated to top priority (if their priority is not already at this level).

Moreover, the communication protocol may include Zigbee and the device profile may include a Zigbee cluster library or a vendor-specific electronic-device attribute. Alternatively or additionally, the communication protocol may include Bluetooth Low Energy (BLE) and the device profile may include a BLE generic attribute (GATT) profile.

Furthermore, in some embodiments, the device-specific information may be requested from a third party based at least in part on the communication protocol. For example, the device-specific information may be requested and then received from the third party when the second electronic device communicates using a communication protocol that is compatible with an IEEE 802.11 standard.

Additionally, the communication history may include an amount of data traffic or a frequency of communication with the second electronic device.

In some embodiments, the determination may involve computing a weighted summation of one or more parameters specified by the device-specific information.

Note that the set of queues may be implemented in the electronic device (i.e., locally) or in a third electronic device at a remote location (e.g., in a network-accessible or cloud-based computer that is associated with the electronic device).

Moreover, the electronic device may include an access point or an eNodeB.

Furthermore, the electronic device may perform a scan for electronic devices prior to determining the device-specific information.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method, which may be performed by the electronic device. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
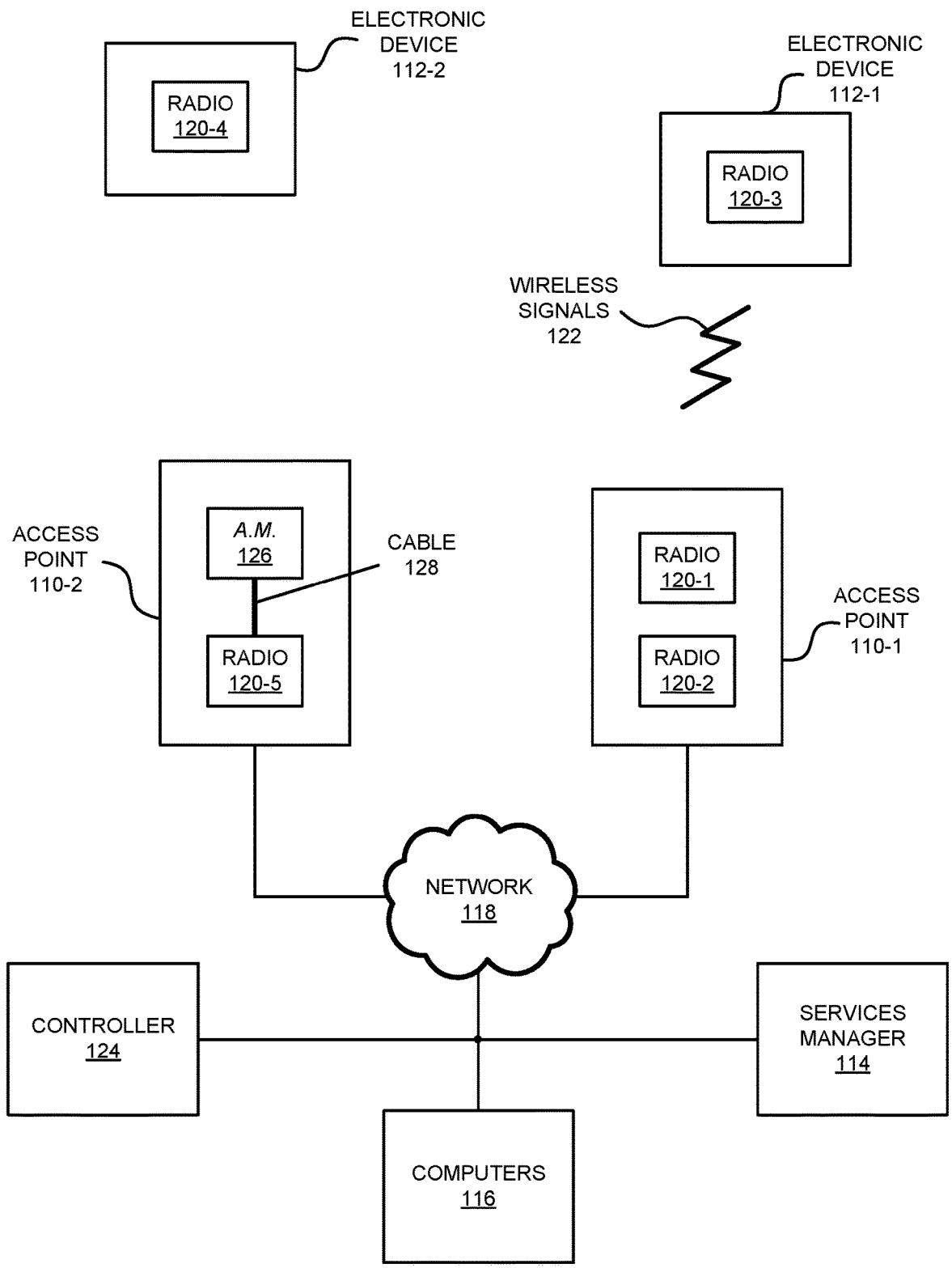
FIG. 1 is a block diagram illustrating an example of communication among electronic devices in accordance with an embodiment of the present disclosure.

An electronic device (such as an access point or an eNodeB) that selectively provides prioritized communication is described. During operation, the electronic device may receive one or more packets or frames from a second electronic device using a communication protocol. Then, the electronic device may determine device-specific information based at least in part on a device profile associated with the communication protocol and/or a communication history of the second electronic device. Next, based on the determined device-specific information, the electronic device may assign additional data traffic associated with the second electronic device to a queue in a set of queues, where queues in the set of queues have different priorities, and where the queue provides a predefined latency of communication with the second electronic device corresponding to a priority of the queue.

By assigning the additional data traffic to the queue (and, therefore, providing a predefined latency of communication), the communication techniques may ensure that the additional data traffic of the second electronic device is handled with the appropriate priority (such as a priority that matches the needs of the second electronic device). For example, this may ensure that mission-critical data traffic (such as data traffic associated with a panic button, a fire alarm or a smoke detector, a carbon-monoxide detector, a camera, a door lock, a light switch, a motion detector, or a burglar alarm) is processed with high priority and, thus, low latency. Alternatively, intermittent or infrequent data traffic from a second electronic device that includes a battery or a long wake-up time interval may have a lower priority and, thus, may be assigned to a queue with a larger predefined latency. Consequently, the communication techniques may improve the communication performance (such as providing device or service-specific reduced latency) of the electronic device and the second electronic device. More generally, the communication techniques may ensure that system resources are appropriately allocated without adversely affecting communication performance. Therefore, the communication techniques may reduce cost and complexity of the electronic device, while maintaining the user experience when communicating using the electronic device and the second electronic device, and may enable the IoT.

In the discussion that follows, electronic devices (such as an access point or an eNodeB) communicate frames or packets in accordance with one or more wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), BLE (from the Bluetooth Special Interest Group of Kirkland, Wash.), Zigbee (from the Zigbee Alliance of Davis, Calif.), Z-Wave (from Sigma Designs, Inc. of Fremont, Calif.), LoRaWAN (from the Lora Alliance of Beaverton, Oreg.), Thread (from the Thread Group of San Ramon, Calif.), IPv6 over low-power wireless personal area networks or 6LoWPAN (from the Internet Engineering Taskforce of Fremont, Calif.) and/or another type of wireless interface. In the discussion that follows, Wi-Fi, Zigbee and BLE are used as illustrative examples. However, a wide variety of communication protocols (such as Long Term Evolution or LTE, another cellular-telephone communication protocol, etc.) may be used.

Moreover, the access point or eNodeB may communicate with other access points, eNobdeBs and/or computers in a network using a wired communication protocol, such as an IEEE 802.3 standard (which is sometimes referred to as 'Ethernet'), Message Queueing Telemetry Transport (MQTT) and/or another type of wired interface. In the discussion that follows, MQTT and Ethernet are used as illustrative examples.

FIG. 1 presents a block diagram illustrating an example of communication among one or more access points 110, one or more electronic devices 112 (such as a cellular telephone), a services manager 114, and one or more computers 116 associated with service providers in accordance with some embodiments. Notably, access points 110 may communicate with each other and other components in FIG. 1 using wireless and/or wired communication. Note that access points 110 may include a physical access point and/or a virtual access point that is implemented in software in an environment of an electronic device or a computer. Furthermore, at least some of access points 110 may communicate with electronic devices 112 using wireless communication.

The wired communication among access points 110 and other components (such as services manager 114) may occur via network 118 (such as an intra-net, a mesh network, point-to-point connections and/or the Internet) and may use a network communication protocol, such as Ethernet or MQTT. Moreover, the wireless communication using Wi-Fi or another wireless communication protocol (such as BLE or Zigbee) may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, wireless communication by access points 110 also involves the use of dedicated connections, such as via a peer-to-peer (P2P) communication techniques.

Figure 10:
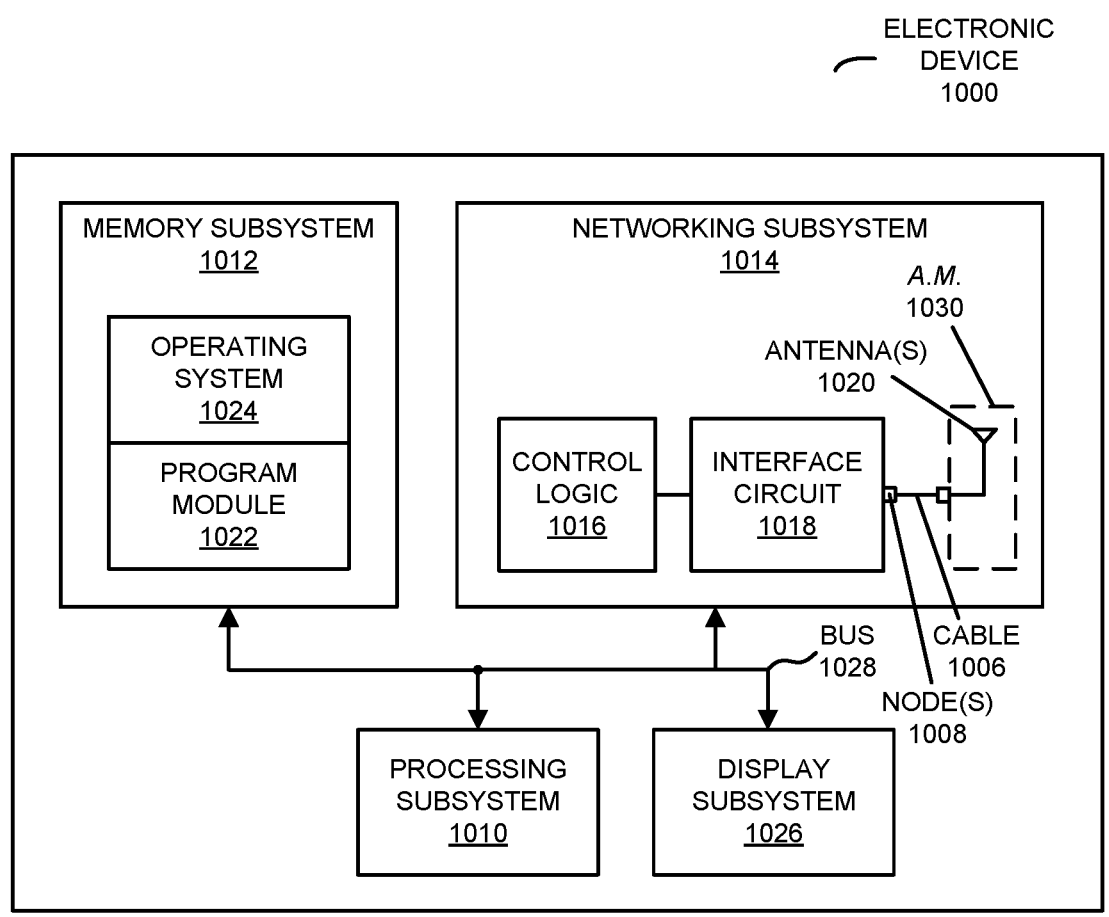
FIG. 10 is a block diagram illustrating an electronic device in accordance with an embodiment of the present disclosure.

As described further below with reference to FIG. 10, access points 110, electronic devices 112, services manager 114 and/or computers 116 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120. In some embodiments, such as in access point 110-2, radio 120-5 is coupled to a separate antenna module (A.M.) 126 by a cable 128.

As can be seen in FIG. 1, wireless signals 122 (represented by a jagged line) are transmitted from radios 120-1 and/or 120-2 in access point 110-1. These wireless signals may be received by radio 120-3 in electronic device 112-1. Notably, access point 110-1 may transmit frames or packets. In turn, these frames or packets may be received by electronic device 112-1. Moreover, access point 110-1 may allow electronic device 112-1 to communicate with other electronic devices, computers and/or servers via network 118.

Note that the communication between at least pairs of components in FIG. 1 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving wireless signals 122 with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously and as described further below with reference to FIG. 2, one of access points 110 (such as access point 110-1) may perform at least some aspects of the communication techniques. This may allow access points 110 to become one-touch points of access to the IoT using a single framework. Notably, access points 110 may facilitate the dynamic integration of multiple electronic devices and service providers in a variety of applications, as well as easy deployment and upgrades.

In some embodiments, access point 110-1 may provide co-existing or concurrent communication using different communication protocols. Notably, access point 110-1 may include radio 120-1 and/or 120-2. These radios may, respectively, communicate using different communication protocols in a shared band of frequencies (such as the 2.4 GHz ISM band of frequencies). For example, radio 120-1 may be a BLE radio and radio 120-2 may be a Wi-Fi radio (or vice versa). During operation, radio 120-2 may perform a scan of available channels in the shared band of frequencies. Radio 120-2 may detect or determine that BLE and Wi-Fi may each use one of primary channels 1, 6 and 11 (such as channel 1). Alternatively, radio 120-2 may receive, from radio 120-1 (if access point 110-1 includes radio 120-1), information specifying one or more used channels in the shared band of frequencies that are reserved or used by the BLE communication protocol. Next, radio 120-2 may mask the one or more used channels from the available channels (such as by masking out 8-16 MHz corresponding to primary channel 1), and radio 120-2 may select one or more channels from remaining available channels for use with the Wi-Fi communication protocol, such as a new primary channel. Thus, because Wi-Fi has the ability to hop among different channels while BLE and Zigbee typically do not hop, channel masking may be used to facilitate co-existing and/or concurrent communication among access points 110 and electronic devices 112 using two different communication protocols in the shared band of frequencies.

While access point 110-1 is illustrated with separate radios 120-1 and 120-2, in some embodiments these radios are combined into a single radio or integrated circuit. Alternatively or additionally, packet-traffic arbitration between radios 120-1 and 120-2 may be used. Notably, when one of the radios is transmitting or receiving using a channel and a first communication protocol, it may communicate a hold (such as a hold signal or instruction) to the other radio, so that the other radio temporarily does not communicate using the channel and a second communication protocol.

In some embodiments, additional communication capability is added to access point 110-1 via a plug-in module, such as a dongle (which is sometimes referred to as a 'USB dongle') that is inserted into a USB port in access point 110-1. For example, radio 120-1 may be a USB dongle that adds BLE communication capability to access point 110-1. In conjunction with software on access point 110-1, this may enable communication-protocol recognition and translation, as well as communication via another communication protocol (as was just described).

Figure 7:
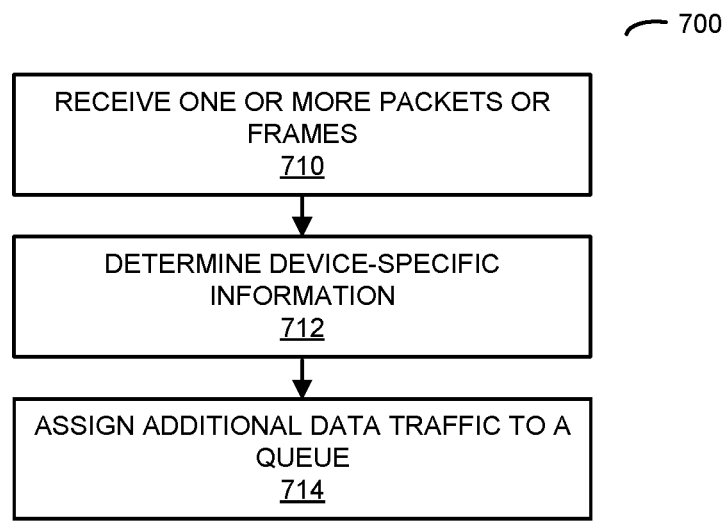
FIG. 7 is a flow diagram illustrating an example of a method for selectively providing prioritized communication in one of the electronic devices in FIG. 1 in accordance with an embodiment of the present disclosure.

Moreover, as described further below with reference to FIGS. 7-9, access point 110-1 may assigns traffic associated with one or more of electronic devices 112 to different queues. During operation, access point 110-1 may receive, at radio 120-1 or 120-2, one or more packets or frames associated with a second electronic device, e.g., that were sent by electronic device 112-1. Then, access point 110-1 may determine device-specific information based at least in part on a device profile associated with the communication protocol (such as an attribute or characteristic of electronic device 112-1) and/or a communication history of electronic device 112-1 (such as an amount of data traffic or a frequency of communication with electronic device 112-1). For example, access point 110-1 may use a header in the one or more packets or frames to identify electronic device 112-1, such as a media access control (MAC) address. Moreover, access point 110-1 may access a stored data structure with characteristics or attributes of different electronic devices, such as a data structure that is associated with the communication protocol. Note that the communication protocol may include Zigbee and the device profile may include a Zigbee cluster library or a vendor-specific electronic-device attribute. Alternatively or additionally, the communication protocol may include BLE and the device profile may include a BLE GATT profile. Furthermore, note that the data structure may be stored locally (e.g., in memory in access point 110-1) and/or remotely (e.g., in services manager 114 and/or an optional controller 124).

For example, the device-specific information may include: a type of the second electronic device, a type of service associated with electronic device 112-1, whether electronic device 112-1 is battery powered and/or whether electronic device 112-1 has a wake-up time interval (such as a time interval between 7 and 21 s). Alternatively or additionally, the device-specific information may include or may (indirectly) specify a priority associated with data traffic to and/or from electronic device 112-1.

However, depending on the communication protocol, the device-specific information may be requested and then received from a third party based at least in part on the communication protocol. For example, the device-specific information may be requested and received from the third party (such as one of computers 116) when electronic device 112-1 communicates using a communication protocol that is compatible with an IEEE 802.11 standard.

Additionally, the determination may involve computing a weighted summation of one or more parameters specified by the device-specific information. For example, the one or more parameters may include: the type of service, an amount of data traffic, the frequency of communication (such as how often electronic device 112-1 transmits or receives one or more packets or frames), a power-source (such as a battery), a wake-up time interval, etc. However, depending on the values of the one or more parameters, a particular parameter may dominate relative to the other parameters in the determination. For example, if the type of service includes a panic button, a fire or smoke alarm, a carbon-monoxide detector, a camera, a door lock, a light switch, a motion detector, a burglar alarm, etc., then the determination may be based solely on the type of service (i.e., the other parameters may not be used in the determination).

Next, based on the determined device-specific information, access point 110-1 may assign additional data traffic associated with electronic device 112-1 to a queue in a set of queues, where queues in the set of queues have different priorities, and where the queue provides a predefined latency of communication with electronic device 112-1 corresponding to a priority of the queue. In the present discussion, a 'predefined latency' is an upper bound on the time delay for processing or communication of data traffic after it is received by access point 110-1 and assigned to the queue. Note that while the upper bound may be configurable or adjustable, once it is defined or specified, it may have a fixed value until it is reconfigured or adjusted again.

In some embodiments, instead of determining the device-specific information, access point 110-1 may determine a queue priority associated with electronic device 112-1 based at least in part on information in the one or more packets or frames. For example, access point 110-1 may use a header in the one or more packets or frames to identify electronic device 112-1, such as a media access control (MAC) address. Moreover, access point 110-1 may access a stored data structure with characteristics of different electronic devices, and using the MAC address may determine that electronic device 112-1 is battery powered with low priority and/or has a low frequency of or long-time intervals between communications with access point 110-1. Consequently, access point 110-1 may assign traffic associated with electronic device 112-1 to a higher latency queue. On the other hand, if access point 110-1 determines that electronic device 112-1 is not battery powered, has a high priority (such as a smoke or carbon-monoxide detector, a burglar alarm, etc.) and/or that it has a high frequency of or short-time intervals between communications with access point 110-1 (which may include transmitting and/or receiving packets or frames), access point 110-1 may assign traffic associated with electronic device 112-1 to a lower latency queue. Furthermore, access point 110-1 may determine the queue priority of electronic device 112-1 based at least in part on one or more characteristics of or associated with electronic device 112-1, such as: an interval between communications with electronic device 112-1, whether the communications are scheduled, a type of power source in electronic device 112-1, a type of data traffic communicated with electronic device 112-1, and/or a priority associated with the type of data traffic. Next, when access point 110-1 receives one or more additional data traffic associated with electronic device 112-1, access point 110-1 may provide the additional data traffic or information to a queue in a set of queues having a predefined latency corresponding to the determined queue priority.

Thus, access point 110-1 may use electronic-device fingerprinting based on the communication protocol, the communication history, information in one or more headers and/or a data structure with characteristics of electronic devices to determine the device-specific information and/or the queue priority (and, more generally, to ensure a quality of service or to assure a service level associated with the communication to and/or from electronic device 112-1). This capability may allow access point 110-1 to respond in an appropriate manner, such as a rapid or fast response to intermittent data from a high-priority electronic device, such as a panic button, a smoke detector or a fire alarm, a carbon monoxide detector, a camera, a door lock, a light switch, a motion detector, or a burglar alarm.

Furthermore, as described further below with reference to FIGS. 3 and 4, additional infrastructure may perform or implement at least some aspects of the communication techniques. Notably, services manager 114 may enable dynamic integrated solutions with disparate (and otherwise potentially incompatible) components, such as one or more sensors (which are sometimes referred to as an 'IoT device') and/or actuators from different manufacturers (which are sometimes referred to as an 'IoT device'), and/or one or more service providers. These different components may be associated with different (unrelated) entities, such as different companies or organizations. Note that in the present discussion an 'IoT device' may have a sensing capability and/or an actuation capability.

Notably, services manager 114 may include: a gateway that communicates with one or more of access point 110 via a communication protocol (such as MQTT); a control and management plane with system-configuration information; and a data plane with a registry of the one or more electronic devices 112, rules for the one or more electronic devices 112, and application programming interfaces (APIs) for service providers. Services manager 114 may provide a programmable, modular and integrated system for flexibly and securely exchanging data and associated services among access points 110, electronic devices 112, services manager 114 and computers 116. Note that resources in services manager 114 that are associated with different service providers may be contained in separate virtual machines. Alternatively or additionally, the resources from different service providers may be included in 'containers,' such as docker containers). Furthermore, the control and management plane and the data plane may be implemented in separate software stacks in services manager 114.

In some embodiments, optional controller 124 is used to configure settings of access points 110, such as transmit power, a transmit antenna pattern, a receive antenna pattern, etc. Thus, controller 124 may provide Wi-Fi control and management planes. Moreover, controller 124 may initialize IoT services that are facilitated and managed by services manager 114, i.e., services manager 114 may provide IoT data plane and control and management plane. In addition, services manager 114 may provide a partner portal for Wi-Fi and IoT management by one or more of computers 116. Note that in some embodiments, controller 124 may be combined with services manager 114 in a single device. Furthermore, note that controller 124 and/or services manager 114 may be local devices where access points 110 and electronic devices 112 are installed and used, or may be at a remote location (such as a cloud-based implementation).

In these ways, the communication techniques may enable the IoT. Notably, access points 110 and services manager 114 may provide a single-access network for Wi-Fi and IoT traffic. Access points 110 and services manager 114 may: manage network across different physical layers, provide IoT device-to-backend management, and/or distributed decision-making (such as at the edge immediately behind a firewall versus backend processing). Moreover, access points 110 and services manager 114 may be: transport protocol agnostic, architecture agnostic to the transport layer, and/or may support a variety of communication or transport protocols, such as Zigbee, BLE and/or other IoT communication protocols. Furthermore, access points 110 and services manager 114 may: provide a network backbone for a variety of services, enable end-to-end services for multiple connected ecosystems, and/or provide end-to-end solutions with a simplified value chain and a single network.

In these ways, the communication techniques may allow access points 110 and/or services manager 114 to provide flexible and secure exchange of data and the associated services. Moreover, the communication techniques may remove siloes between components from different manufacturers and providers (such as local electronic devices that provide sensing capabilities and actuators and service providers), and may facilitate dynamic services for customers (such as services that are configured and provided as needed). Furthermore, services manager 114 may facilitate interoperability of disparate components from different manufacturers and providers without requiring a standard or retrofitting of legacy equipment. Additionally, services manager 114 may eliminate the need for additional (and expensive) dedicated equipment (such as separate gateways for electronic devices from different manufacturers and/or additional network switches to connect to different cloud-based service providers). Thus, services manager 114 may enable integrated solutions and the IoT, which may allow a wide variety of valued-added applications and services, enhanced economic activity and enhanced user experiences and customer satisfaction.

While the communication techniques in FIG. 1 is illustrated using access points 110 and services manager 114, in other embodiments at least some of the access points 110 may be eNodeBs (not shown). Moreover, an eNodeB may communicate with at least one of access points 110, e.g., using an LTE-WLAN aggregation (LWA) communication protocol.

We now further describe embodiments of access points 110 and services manager 114. Current IoT-device gateways often operate within closed proprietary ecosystems, which can make it difficult to integrate a wide array of management platforms and disparate IoT-device networks. These problems are typically compounded by architectural limitations. For example, the gateways may have monolithic non-modular architectures that often are not scalable and customizable for different IoT-device network deployment scenarios, and these gateways are usually tied to expensive purpose-built hardware.

In order to address these challenges, access points 110 may aggregate and disburse data across disparate IoT device, and may include data-acquisition and data transformation capabilities (such as a data acquisition and transformation engine or control logic). In addition, services manager 114 may include: a gateway abstraction service, an internal software development kit (SDK) that allows management of a control and management plane, and/or a partner services SDK that allows partner services providers to manage contained resources in services manager 114 that are associated with the partner services providers. Note that communication between services manager 114 and access points 110 may use a communication protocol, such as MQTT.

Figure 2:
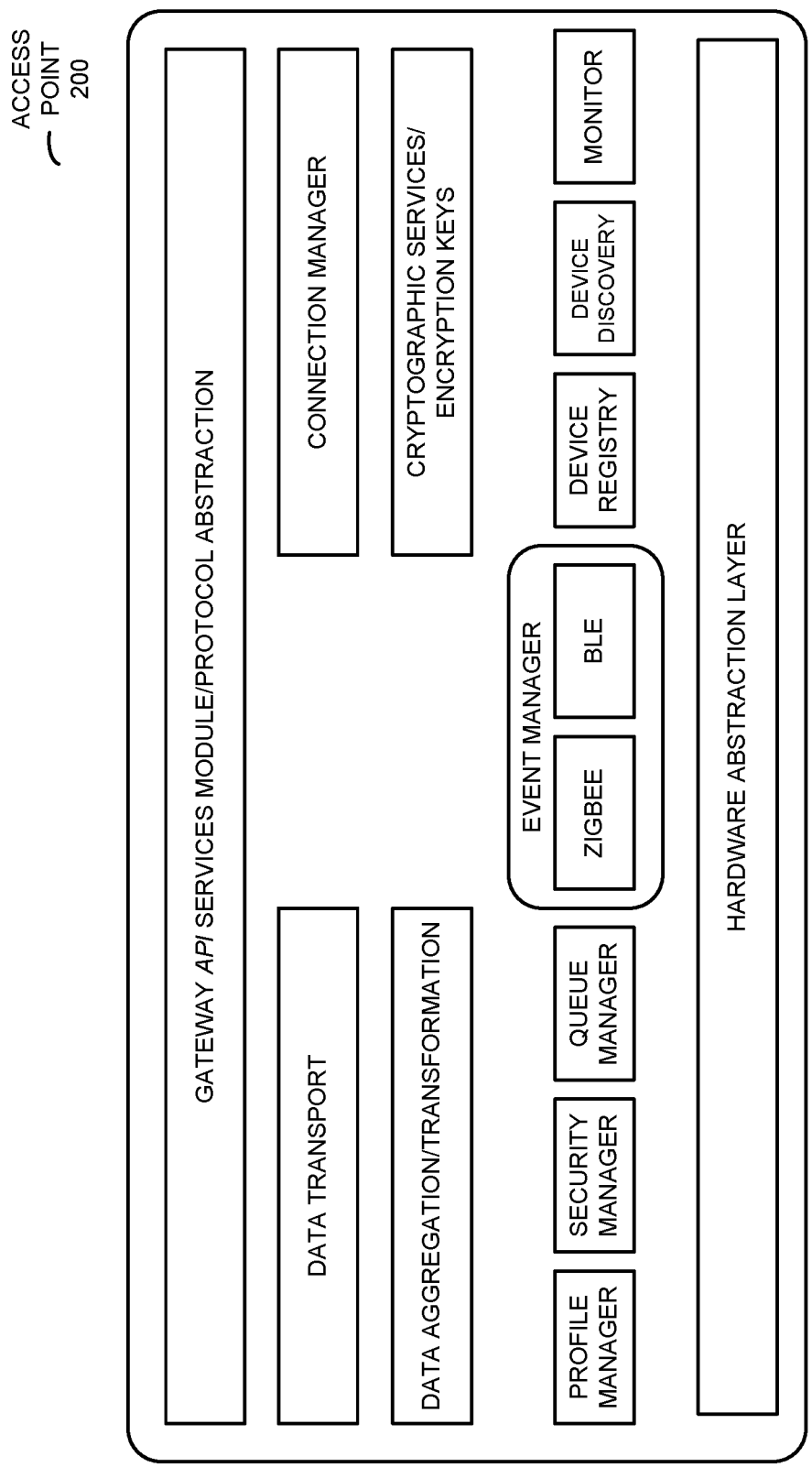
FIG. 2 is a drawing illustrating an example of functionality of an access point in FIG. 1 in accordance with an embodiment of the present disclosure.

FIG. 2 presents a drawing illustrating an example of functionality of an access point 200, such as access point 110-1 in FIG. 1. Access point 200 may include an embedded IoT gateway and may provide an IoT-device management platform that is programmable and that can be easily integrated with existing management solutions. The core gateway functions in access point 200 may include: different communication-protocol stacks, a hardware for communication-protocol abstraction (which can provide a unified view of IoT devices to management platform), data acquisition (such as data aggregation and transformation), prioritization (data/traffic prioritization), management (which can access and set an electronic-device configuration), security (secure electronic-device authentication/actuation and cryptographic services, such as storing one or more encryption keys associated with particular electronic devices), data transport (such as MQTT), a connection manager and/or a gateway API services module and communication-protocol abstraction. In addition, access point 200 may include: an event manager core application (for different communication protocols, such as Zigbee or BLE), a profile manager for the different communication protocols, a security manager, a queue manager, an electronic-device registry, electronic-device discovery and/or a monitor that ensures safe and appropriate operation (such as by detecting an anomaly), and that tracks communication performance, etc.

In some embodiments, access point 200 may include a trusted secure element, WLAN firmware, an IoT gateway engine or control logic (such as one or more physical layer communication protocols) and an application layer that translates between different communication protocols. Note that a given access point may provide at least one communication protocol (in addition to Wi-Fi) via a USB dongle, and groups of access points may be interleaved to provide multiple different communication protocols.

After receiving information (such as IoT-device data or data traffic) from one or more of electronic devices 112 in FIG. 1, access point 200 may translate, into a unified format, the information associated with the one or more electronic devices 112, which may have been received by access point 200, at an interface circuit in access point 200, using different communication protocols. Then, access point 200 may send or communicate the translated information in a unified and consistent manner to a services manager, such as services manager 114 (FIG. 1). For example, access point 200 may provide, from an interface circuit in access point 200, the translated information for one or more additional electronic devices (such as services manager 114 in FIG. 1) using another communication protocol, such as MQTT.

In some embodiments, access point 200 (or services manager 114 in FIG. 1) may provide security by selectively including communication with an electronic device (such as electronic device 112-1 in FIG. 1) in an inclusion list and/or by selectively excluding communication with another electronic devices (such as electronic device 112-2 in FIG. 1) in an exclusion list. For example, the black and/or white lists may be applied by access point 200 following a scan.

Figure 3:
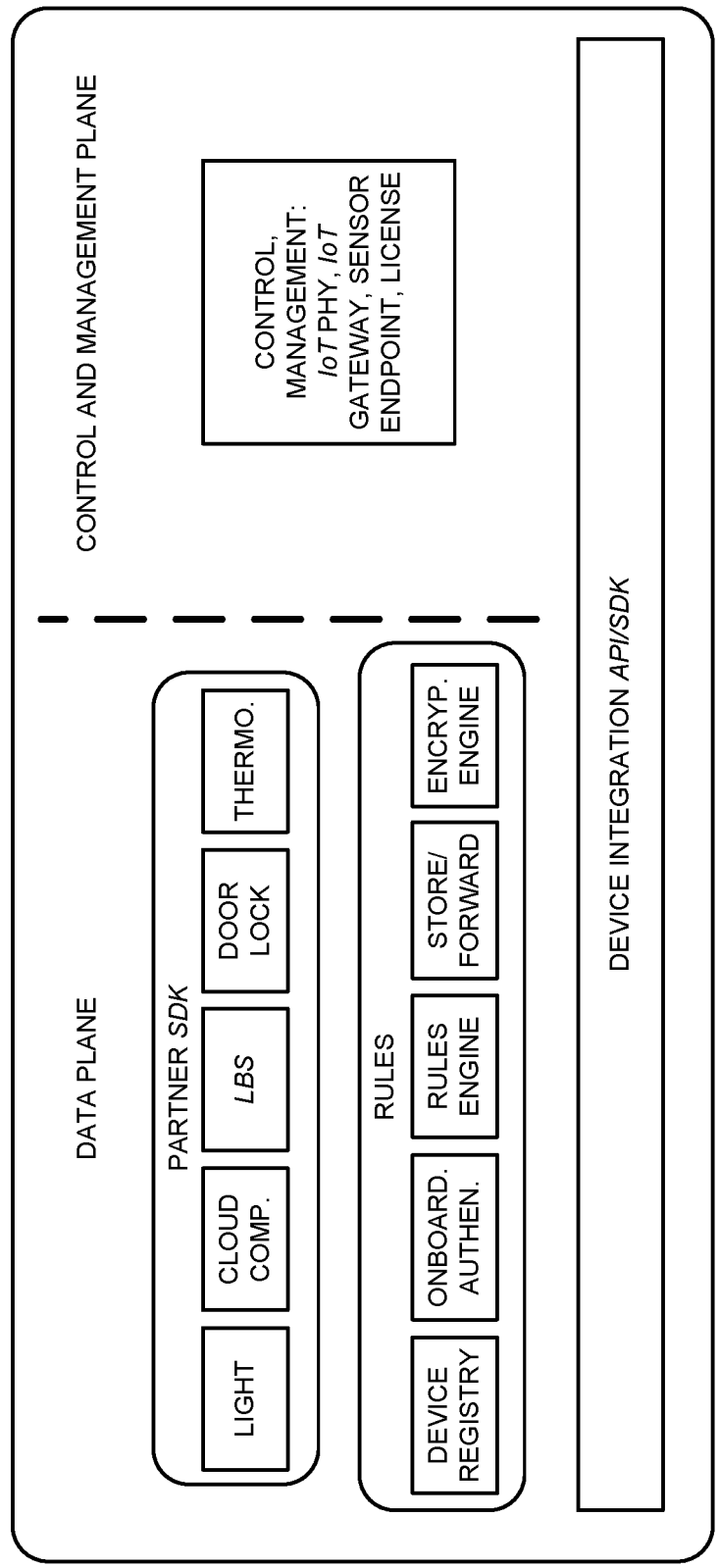
FIG. 3 is a block diagram illustrating an example of an Internet-of-Things (IoT) services manager of FIG. 1 in accordance with an embodiment of the present disclosure.
Figure 4:
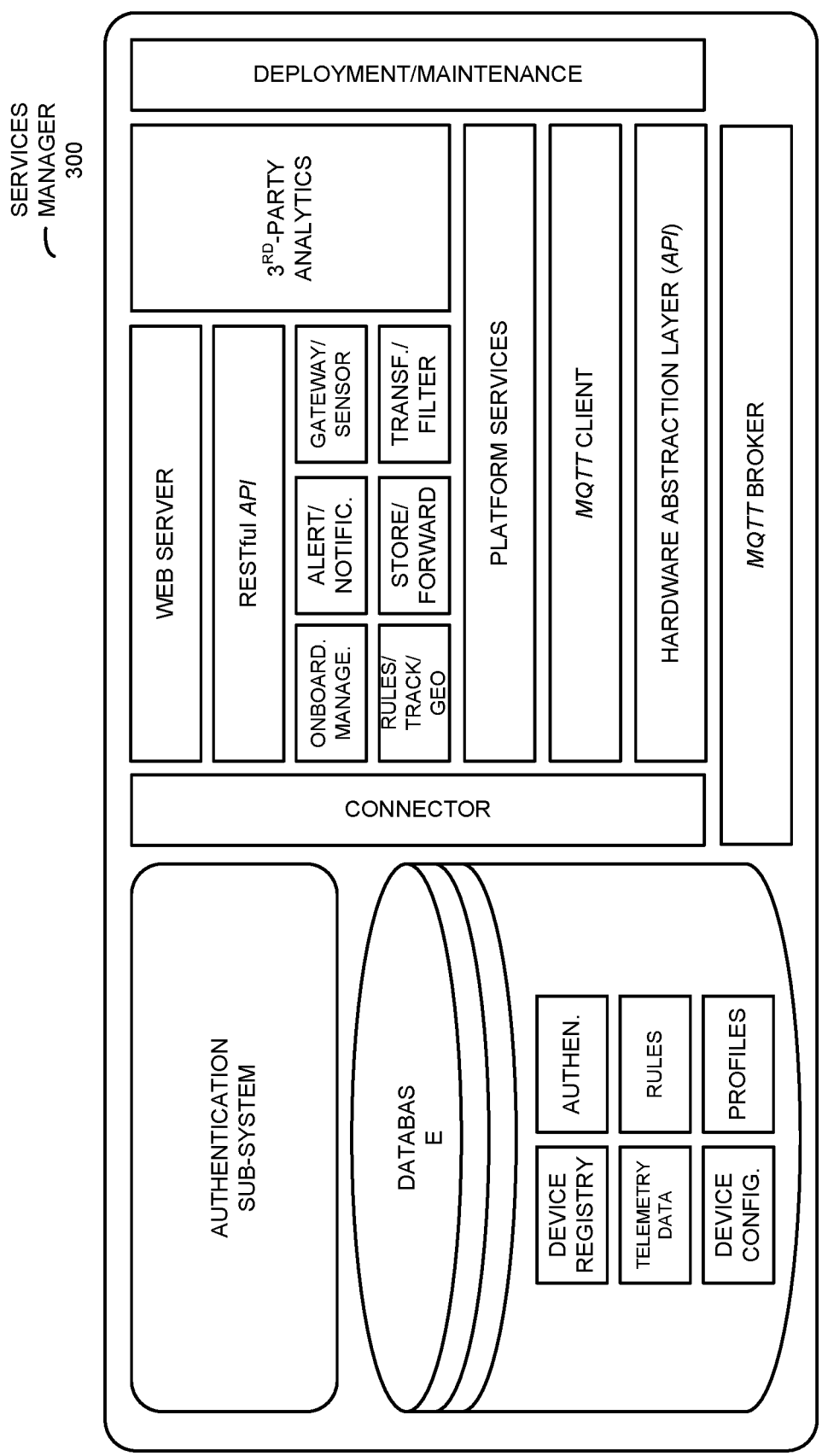
FIG. 4 is a block diagram illustrating an example of a software architecture of the services manager of FIGS. 1 and 3 in accordance with an embodiment of the present disclosure.

FIG. 3 presents a block diagram illustrating an example of a Virtual Internet-of-Things (VIoT) services manager 300, such as services manager 114 in FIG. 1. This services manager may include: a gateway that communicates with one or more access points 110 (FIG. 1) via a communication protocol (such as MQTT); a control and management plane with system-configuration information; and a data plane with a registry of the one or more of electronic devices 112 (FIG. 1), rules for the one or more of electronic devices 112, and APIs for service providers. Services manager 300 may provide a programmable, modular and integrated system for flexibly and securely exchanging data and associated services among access points 110, electronic devices 112, services manager 114 or 300, and computers 116 in FIG. 1. Moreover, resources in services manager 300 that are associated with different service providers may be contained in separate virtual machines. Alternatively or additionally, the resources from different service providers may be included in 'containers,' such as docker containers. Note that a docker container may be a lightweight, stand-alone, executable package of a piece of software that includes everything needed to run it: code, runtime, system tools, system libraries, and settings. The containerized software may run the same, regardless of the environment. Containers also may isolate software from its surroundings, such as differences between development and staging environments, and may help reduce conflicts between different software that is running on the same infrastructure.

As noted previously, services manager 300 may include a control and management plane. The control and management plane may include: control management, an IoT physical layer, a gateway (such as a gateway engine, control logic or module), an IoT-device endpoint, and/or associated licenses. In addition, the control and management plane may provide system-architecture configuration, such as: transmit power, Internet Protocol or IP addresses, etc.

Moreover, services manager 300 may include a data plane with a partner SDK (for applications/services such as: a door lock, a thermostat, a light, analytical services, location-based services or LBS, cloud-based computing, etc.). Furthermore, the data plane may include rules, such as: an electronic-device registry (which may include device-specific information in device profiles), a rules engine or module, onboarding, authentication, an encryption engine or control logic, and store and forward.

Services manager 300 may be a dual-stack, open-programmable, virtualized IoT-device-management gateway platform. It may be highly customizable, deployable in multiple network topologies, and may be integrated with existing management networks. The dual-stack, open-programmable, virtualized IoT-device-management gateway platform may be an enterprise-grade IoT-device-management platform. Note that services manager 300 may be a policy-driven virtualized wireless gateway that manages an IoT-device network that includes one or more types of IoT devices from one or more manufacturers, and which may use different communication protocols. The open framework may facilitate IoT-device management in separate virtual machines, which may offer different vertical services.

In some embodiments, access point 200 (FIG. 2) and/or services manager 300 addresses a typical IoT-device-network management system, which may include: wireless IoT devices, a physical communication layer, a network connectivity/protocol layer, and/or a gateway layer. Notably, access point 200 (FIG. 2) may include a data acquisition layer. For example, a data acquisition engine or control logic may enable gateway communication at scale with many IoT device using disparate IoT-device connectivity or communication protocols (such as BLE, Zigbee, Z-Wave, etc.). This data acquisition layer may include the drivers and metadata information used to recognize and communicate with the different IoT-device types using different communication protocols.

Moreover, access point 200 (FIG. 2) may include an aggregation and translation layer. Notably, many of the IoT-device connectivity or communication protocols are rudimentary and fragmented. For example, Zigbee or BLE often does not provide support for IP. The aggregation and translation layer may perform the function of normalizing the data collected across these IoT devices. This block may perform packet processing and encapsulation functions for disparate incoming IoT-device packets and the output of this block may be normalized data in a standard format (such as MQTT) that is recognizable by a programmable application layer.

Furthermore, services manager 300 may include a programmable application layer. Notably, a smart-gateway abstraction service in services manager 300 may provide a full edge analysis engine or module. For example, the programmable application layer may implement blocks and functions, such as: a message broker, a rules engine or module, an onboarding engine or module, an electronic-device registry, a store and forward engine or module, and/or an encryption engine of control logic. Note that this layer may host a runtime environment and/or libraries that enable a third-party IoT SDKs, such as the partner service-provider SDKs. The routing of data packets to different third-parties may be based on predefined policies specified by a user, such as a customer or a service-provider partner.

Additionally, services manager 300 may include an open management interface layer.

Services manager 300 may be a self-contained virtual machine that includes APIs that enable customers and/or service-provider partners to add another layer of contextualization/customization based at least in part on specific business needs. This flexibility may make services manager 300 highly programmable and rapidly deployable.

Note that services manager 300 may be architected as a dual-stack gateway. A first stack may include the data acquisition layer and the aggregation and translation layer. As discussed previously, the first stack may physically reside in a wireless access point (such as access point 200 in FIG. 2) and/or in on-premise gateway hardware.

A second stack may include the programmable application layer and the open management interface layer. Note that the second stack is a virtual machine that can reside on any of the wireless gateway hardware, such as access point 200 (FIG. 2), controller 124 (FIG. 1), services manager 300. Thus, the second stack may be on-premise, in a data center or may be cloud-based. Therefore, in general functionality of access point 200 (FIG. 2) and/or services manager 300 may be implemented by an arbitrary component, such as a local or a distributed electronic device or system.

The dual-stack architecture may provide flexibility to be deployed in an arbitrary network topology. In addition, this architecture may enable a distributed gateway architecture.

The core functions of the solution (which is sometimes referred to as an 'IoT gateway') implemented in access point 200 (FIG. 2) and services manager 300 may include: centralized management (secure onboarding management of IoT devices and gateways), data aggregation (aggregate and transform data from multiple gateways), edge analytics (process data at the edge, i.e., behind the firewall, from multiple gateways), hardware abstraction (provide unified view/management of different IoT-device types), and/or rules and alerts (create rules and alerts, predictive analysis, etc.).

The technology and capabilities of the solution implemented in access point 200 (FIG. 2) and services manager 300 may include: self-contained container/virtual machine that can be hosted anywhere (such as a controller, a switch, in the cloud, etc.). Moreover, the solution may have multi-tenants, which provides flexible deployment models and allows the use of a public and/or a private cloud. Furthermore, the solution may have the ability to host $3^{rd}$-party SDKs and may provide a unified view of IoT devices/gateways. Additionally, the solution may incorporate edge computing capabilities (e.g., via a partner SDK and/or internal capability). The solution may be highly modular with a cloud-scale architecture.

In some embodiments, an open, programmable IoT gateway module may be programmed through a multitude of management platforms using one or more interfaces. Moreover, the IoT gateway may be capable of machine learning and intelligent decision making at the edge without back-hauling information to the cloud, e.g., intelligent channel selection and assignment of channels across disparate wireless radios (such as Zigbee, Bluetooth, BLE, Wi-Fi, LoRaWAN, etc.). Furthermore, the IoT gateway may automatic detect anomalies and may dynamically use rules for creation/insertion to suppress anomalies. In addition, the IoT gateway may provide notifications, intelligent tracking and geo fencing of IoT and IoT-device assets. Additionally, the IoT gateway may intelligently identity and classify electronic devices, e.g., learning electronic-device characteristics based on communication patterns, association patterns, and/or beaconing patterns. These characteristics may be used to assign traffic from an electronic device to a queue with an appropriate queue latency. The IoT gateway may also prioritize electronic devices and/or electronic-device categories based on the learned characteristics, which may be used to prioritization of messages and/or message categories. In some embodiments, the IoT gateway may guarantee delivery of certain IoT messages, such as based at least in part on prioritization, intelligent classification and/or machine learning FIG. 4 presents a block diagram illustrating an example of a software architecture of services manager 300. Notably, services manager 300 may include: an MQTT broker, a hardware abstraction layer API, an MQTT client, VIoT platform services (such as Java/Python runtime platform services), a gateway/IoT-device onboarding management, alerts/notifications, gateway/IoT-device actions, a rules engine/tracking/geo fencing, store and forward, and/or data transformation and filter. In addition, services manager 300 may include: $3^{rd}$-party edge analytics, a RESTful API (which uses HTTP requests to GET, PUT, POST and DELETE data) for provisioning, actuation, statistics aggregation and management, a web server, an authentication subsystem, and/or a database. The $3^{rd}$-party edge analytics may interface to external analytics services, the Web server may interface to one or more external cloud-based components, partner management portals, dashboard services and/ or mobile applications. Note that the database may include information, such as: an electronic-device registry, telemetry data, electronic-device configuration, authentication, rules and/or profiles (e.g., electronic-device characteristics or device-specific information). In some embodiments, services manager 300 supports blockchain for highly secure environments.

Figure 5:
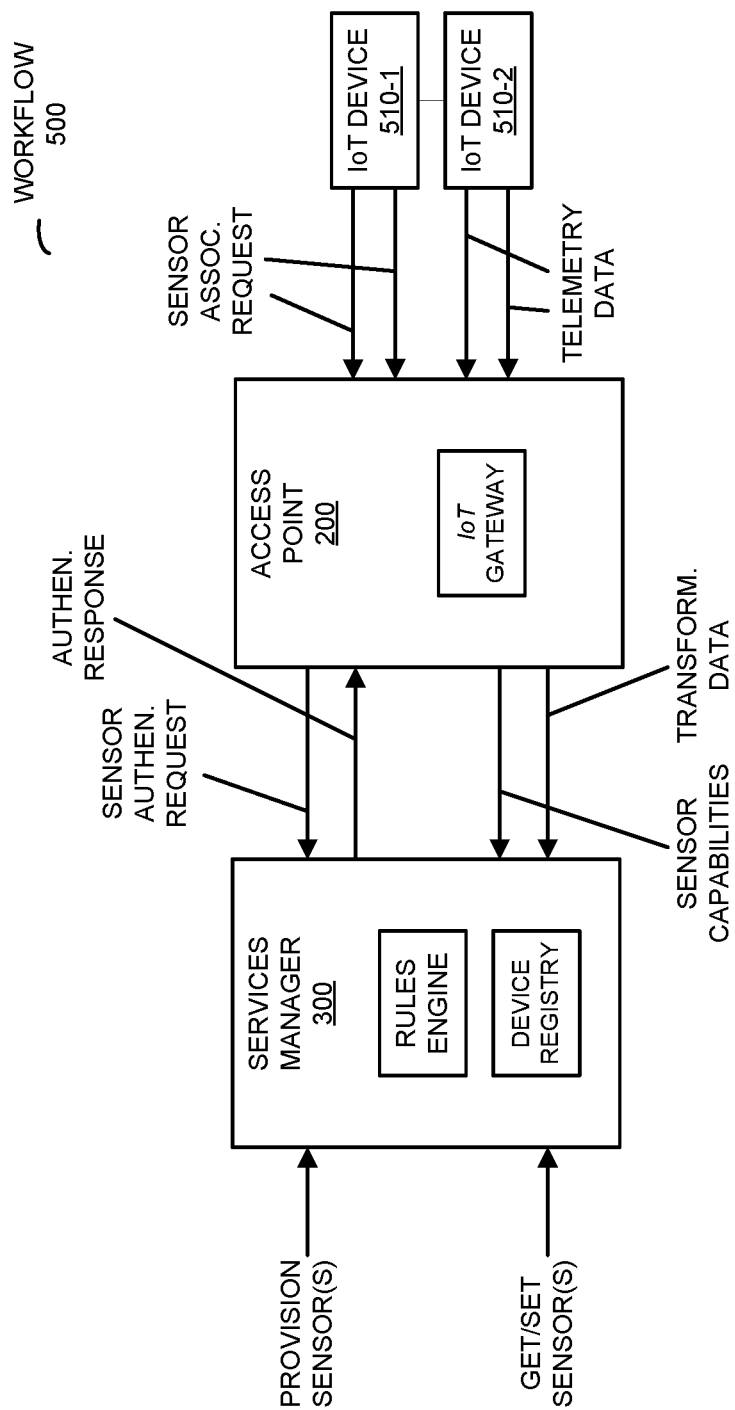
FIG. 5 is a drawing illustrating an example of an onboarding work flow in accordance with an embodiment of the present disclosure.

FIG. 5 presents a drawing illustrating an example of an onboarding work flow 500. Notably, IoT devices may be provisioned via an API call. Then, services manager 300 may create entry in an electronic-device registry. Moreover, one or more of IoT devices 510 may provide an IoT-device associate request to a gateway in access point 200. In response, access point 200 may provide an IoT-device authorization request to services manager 300, and may receive an authorization response. Next, access point 200 may provide information about IoT-device capabilities (and, more generally, characteristics of IoT devices 510). Furthermore, services manager 300 may receive an API call to get or set IoT devices, which may be forwarded to one or more of IoT devices 510. In response, one or more of IoT devices 510 (such as IoT device 510-2) may provide telemetry data. Associated transformed data may be provided by access point 200 to services manager 300. Additionally, services manager 300 may process the transformed data and/or may trigger local rules.

Figure 6:
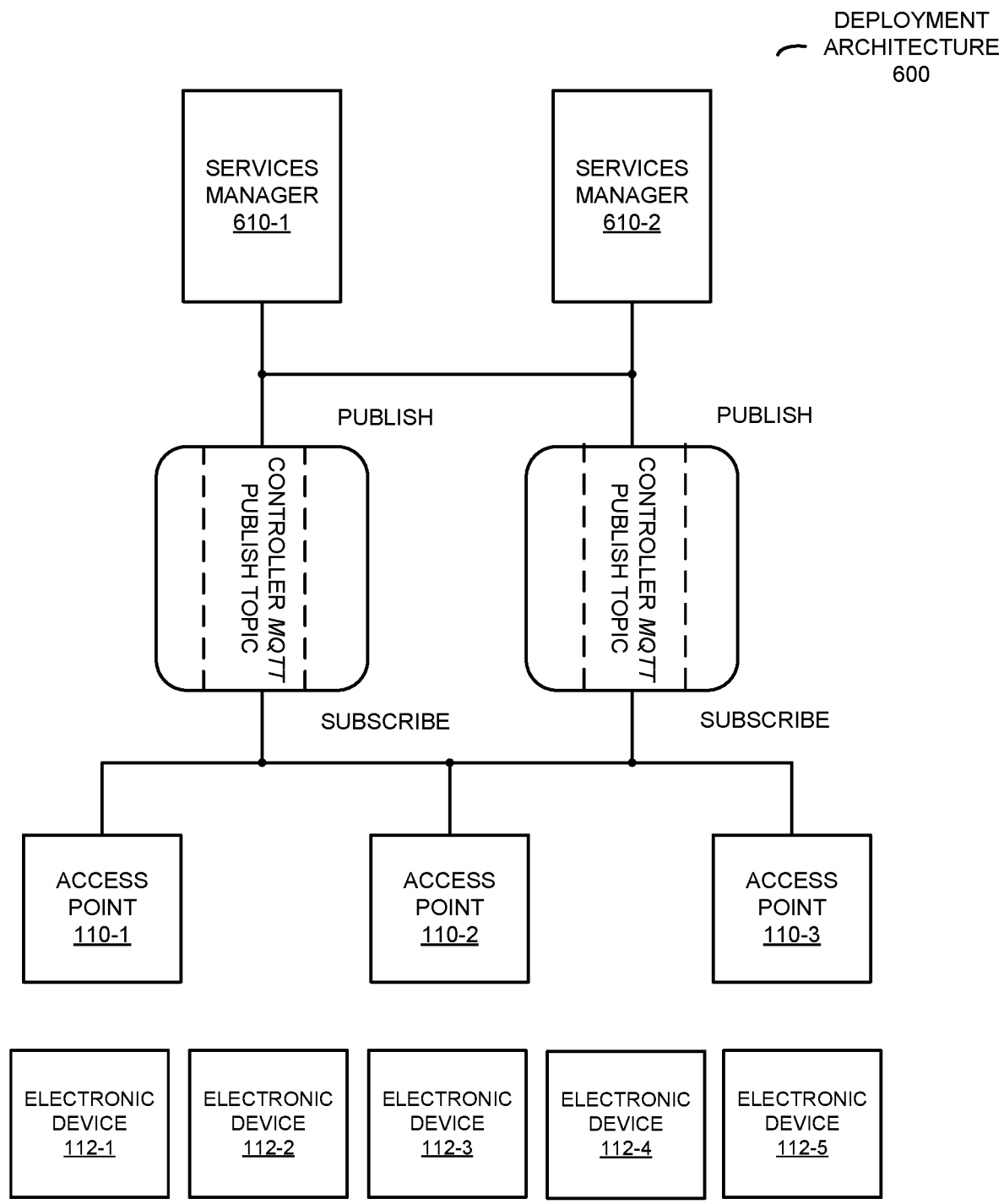
FIG. 6 is a drawing illustrating an example of a deployment architecture in accordance with an embodiment of the present disclosure.

FIG. 6 presents a drawing illustrating an example of a deployment architecture 600. This architecture may include: one or more IoT devices or electronic devices 112 (which may include one or more sensors or sensing capabilities), one or more access points 110 (or gateways), and one or more services managers 610. Services managers 610 may publish or subscribe messages via controller MQTT publish topics. For example, services managers 610 may publish or subscribe messages using channels (which may be static or dynamic) having associated priorities.

Note that a given services manager (such as services manager 610-1) may dynamically configure subdomains in access points 110 and/or electronic devices 112 (FIG. 1) to define a range of communication using a communication protocol, such as MQTT. Alternatively or additionally, the given services manager may dynamically define channels for data traffic with access points 110 and/or electronic devices 112, where the channels are associated with different topics.

While the preceding embodiments illustrate access points 110 and services manager 114 as having particular components and a particular architecture, other embodiments may include fewer or more components, different components and/or a different architecture.

We now describe embodiments of methods associated with the communication techniques. FIG. 7 presents a flow diagram illustrating an example of a method 700 for selectively providing prioritized communication, which may be performed by an electronic device, such as access point 110-1 in FIG. 1. During operation, the electronic device may receive one or more packets or frames (operation 710) associated with a second electronic device using a communication protocol.

Then, the electronic device may determine device-specific information (operation 712) based at least in part on a device profile associated with the communication protocol (such as an attribute or characteristic of the second electronic device) and/or a communication history of the second electronic device. Note that the device-specific information may include: a type of the second electronic device, a type of service associated with the second electronic device, whether the second electronic device is battery powered and/or whether the second electronic device has a wake-up time interval. Alternatively or additionally, the device-specific information may include or may specify a priority associated with data traffic to and/or from the second electronic device.

In some embodiments, priorities of the set of queues may be based at least in part on a large variety of classifications, including an importance of an application. For example, a panic-button application message may have higher priority than other control messages, or, a set of entities, such as tags or premium users, may have messages belonging to a premium category in which the messages are prioritized over messages of other categories. Moreover, priorities of the set of queues may be based at least in part on traffic categorization, in which messages belonging to a connection-oriented applications (e.g., an application that establishes a connection with an electronic device to pass a message) have higher priority than messages belonging to a connectionless applications (e.g., reception of redundant beacon messages from BLE tag devices). Furthermore, priorities of the set of queues may be based at least in part on a timeliness requirement of messages, in which messages belonging to a low-latency category are prioritized over messages of other categories. Additionally, priorities of the set of queues may be based at least in part on a relative weighed categorization of multiple priority classes, in which a priority class (such as a message type of a panic-button pressed message) have a much higher weight than another categorization. For example, a timeliness requirement of low latency may have a higher priority that non-low latency messaging. Note that priorities of the set of queues may be based at least in part on analytics information, such as a past history of messages. Notably, if a past instance of a particular message has failed to gain priority for a longer time than a certain threshold (such as 1-30 s), then based at least in part on analysis of a message history (such as using one or more statistical metrics), the priority can be raised as a result of or in order to address the previous failures. The priorities of the set of queues may be based at least in part on performance conditions of a message passing system. For example, if the message passing system is under a heavy load condition, messages of an administrative type can be elevated to top priority (if their priority is not already at this level).

Moreover, the communication protocol may include Zigbee and the device profile may include a Zigbee cluster library or a vendor-specific electronic-device attribute.

Alternatively or additionally, the communication protocol may include Bluetooth Low Energy (BLE) and the device profile may include a BLE generic attribute (GATT) profile. Furthermore, in some embodiments, the device-specific information may be requested from a third party based at least in part on the communication protocol. For example, the device-specific information may be requested and then received from a third electronic device associated with the third party when the second electronic device communicates using a communication protocol that is compatible with an IEEE 802.11 standard. Additionally, the communication history may include an amount of data traffic or a frequency of communication with the second electronic device. In some embodiments, the determination may involve computing a weighted summation of one or more parameters specified by the device-specific information.

Next, based on the determined device-specific information, the electronic device may assign additional data traffic associated with the second electronic device to a queue (operation 714) in a set of queues, where queues in the set of queues have different priorities, and where the queue provides a predefined latency of communication with the second electronic device corresponding to a priority of the queue. For example, the predefined latency of a higher-priority queue may be smaller than the predefined latency of a lower-priority queue, such that the electronic device subsequently provides or transmits data traffic from the higher-priority queue sooner than data traffic from the lower-priority queue. Note that the set of queues may be implemented in the electronic device (i.e., locally) or in a third electronic device at a remote location (e.g., in a network-accessible or cloud-based computer that is associated with the electronic device).

While operation 714 illustrates the use of the communication techniques with data traffic transmitted to the second electronic device, in other embodiments the communication techniques may be used with data traffic received from the second electronic device. In embodiments where the communication techniques are used with received data traffic from the second electronic device, the electronic device may have a separate receive queue (alternatively or in addition to the transmit queue discussed previously). The receive queue may be used when the electronic device has insufficient communication resources, so the electronic device may not respond to communication from the second electronic device (such as providing a beacon response) right away when the second electronic device has a lower priority. Alternatively, in these embodiments, the electronic device may selectively decline incoming communication from the second electronic device when the second electronic device has a lower priority.

In some embodiments of method 700 there may be additional or fewer operations. Furthermore, the order of the operations may be changed, and/or two or more operations may be combined into a single operation. For example, the electronic device may perform a scan for electronic devices prior to determining the device-specific information (operation 712).

Figure 8:
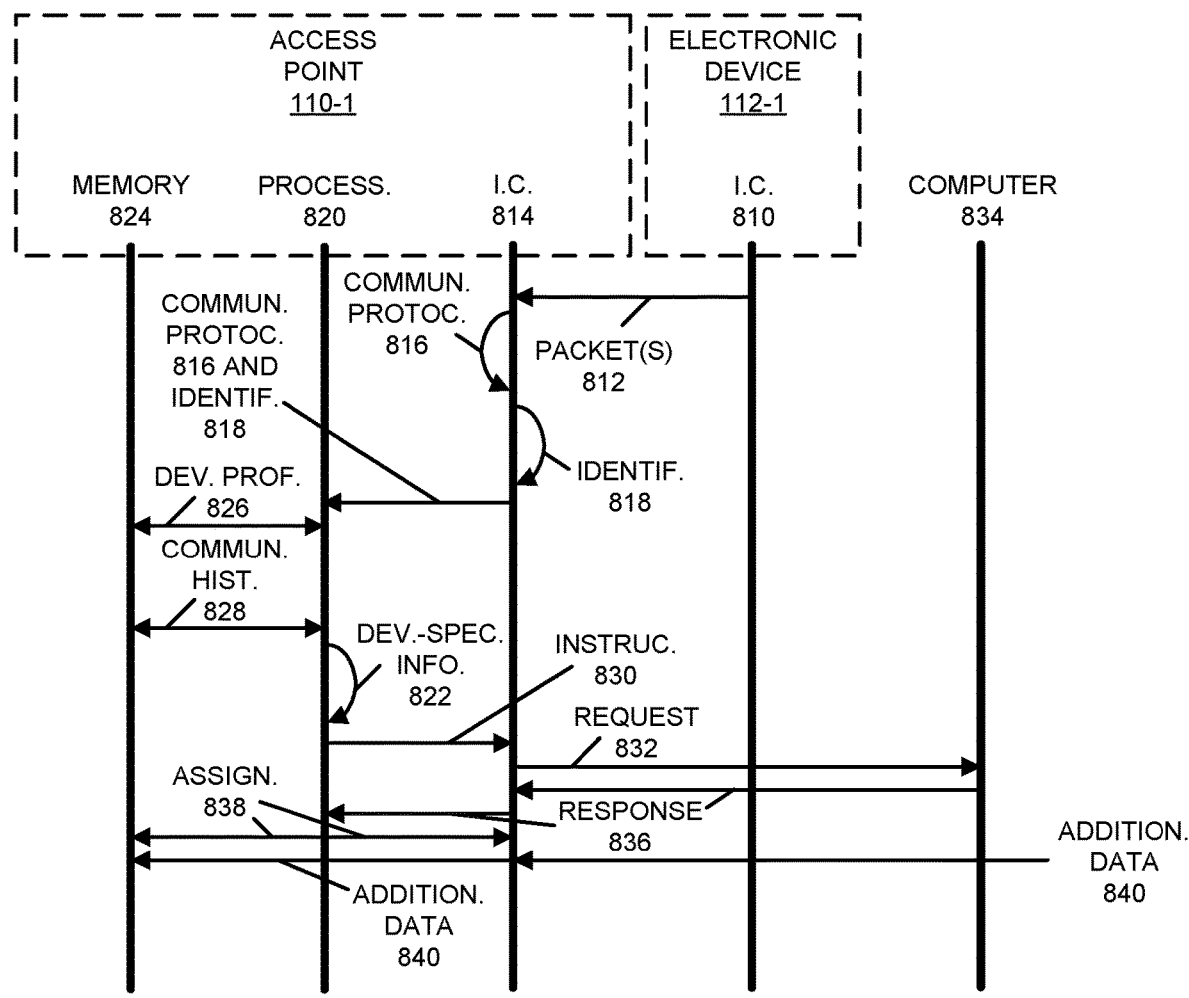
FIG. 8 is a drawing illustrating an example of communication among the electronic devices in FIG. 1 in accordance with an embodiment of the present disclosure.

Embodiments of the communication techniques are further illustrated in FIG. 8, which presents a drawing illustrating an example of communication among access point 110-1, electronic device 112-1 and computer 834. Notably, interface circuit (I.C.) 810 in electronic device 112-1 may provide one or more packets 812 or frames to access point 110-1 using a communication protocol 816.

After receiving the one or more packets 812, interface circuit 814 may provide the communication protocol 816 and/or an identifier 818 of electronic device 112-1 (such as a MAC address) to processor 820 in access point 110-1. Then, processor 820 may determine device-specific information 822. For example, processor 820 may access a device profile 826 stored in memory 824, and may determine the device-specific information 822 by performing a look-up operation in the device profile 826 based at least in part on the communication protocol 816. Alternatively or additionally, processor 820 may access a communication history 828 of electronic device 112-1 (e.g., based at least in part on identifier 818). Then, processor 820 may determine the device-specific information 822 by performing a look-up operation in the device profile 826 based at least in part on the communication history 828. Thus, the device-specific information 822 may be determined based at least in part on the communication protocol 816 and/or the communication history 828 (or, more generally, using in-lane message data and/or out-of-lane data).

Depending on the communication protocol 816, processor 820 may instruct 830 interface circuit 814 to provide a request 832 for the device-specific information 822 to computer 834 associated with a third party (which is other than or different from a user of electronic device 112-1 and a provider of access point 110-1). After receiving request 832, computer 834 may provide a response 836 with the device-specific information 822 to access point 110-1.

Next, based on the determined device-specific information 822, processor 820 may assign 838 additional data traffic associated with electronic device 112-1 to a queue in a set of queues in memory 824, where queues in the set of queues have different priorities, and where the queue provides a predefined latency of communication with electronic device 112-1 corresponding to a priority of the queue. Then, when interface circuit 814 subsequently receives data or information 840 intended for electronic device 112-1, interface circuit 814 may provide information 840 to the queue memory 824.

While FIG. 8 illustrates communication between components using unidirectional or bidirectional communication with lines having single arrows or double arrows, in general the communication in a given operation in this figure may involve unidirectional or bidirectional communication.

Moreover, while FIG. 8 illustrates the use of the communication techniques with data traffic transmitted to electronic device 112-1, in other embodiments the communication techniques may be used with data traffic received from electronic device 112-1.

Figure 9:
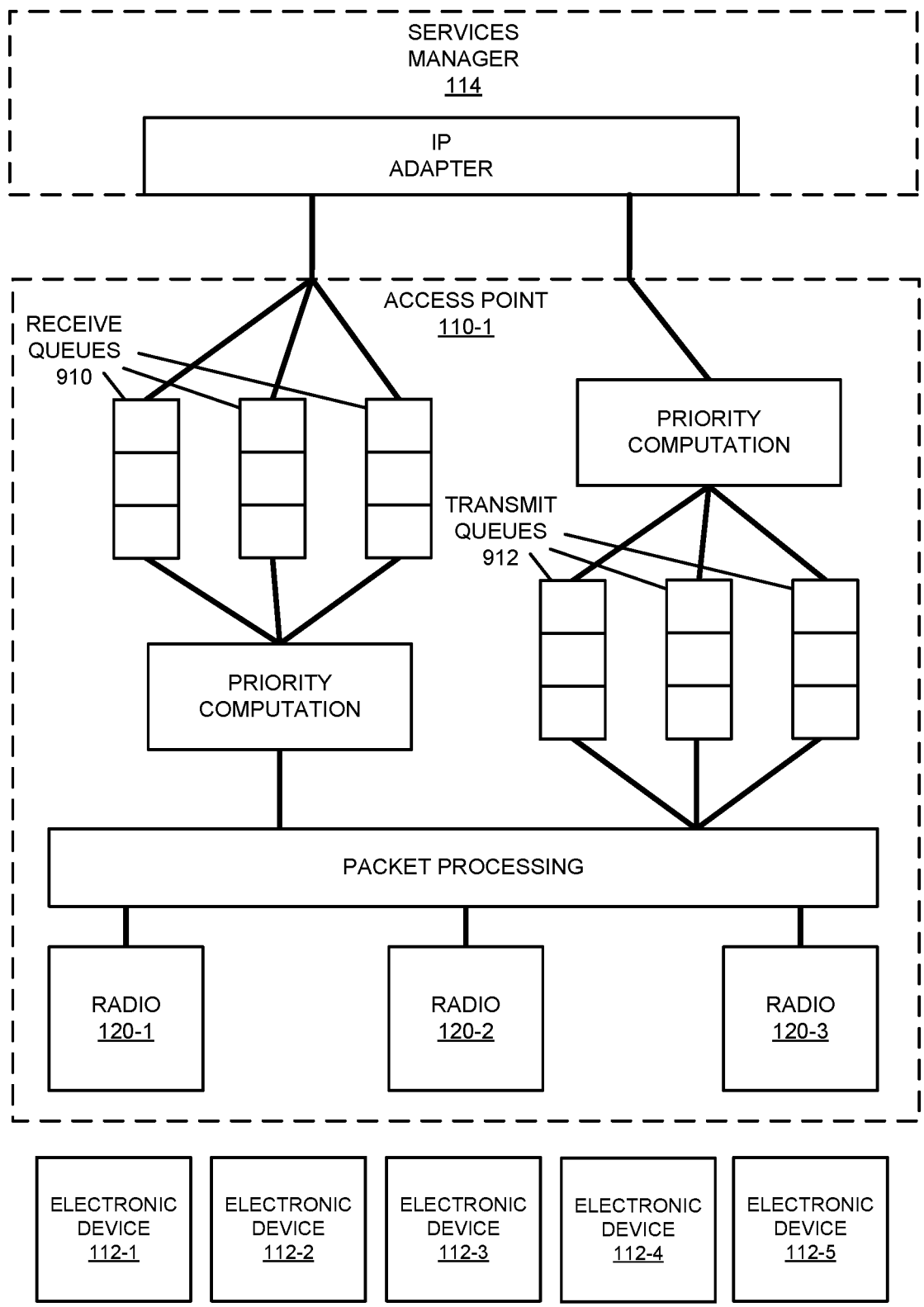
FIG. 9 is a drawing illustrating an example of the electronic devices in FIG. 1 in accordance with an embodiment of the present disclosure.

FIG. 9 presents a drawing illustrating an example of the electronic devices in FIG. 1 in accordance with an embodiment of the present disclosure. Notably, in FIG. 9, services manager 114 may assign data traffic to different receive queues 910 and/or transmit queues 912 in access point 110-1.

When IoT messaging in an access point needs to reach high scale and a part of this traffic has a requirement for a high-service assurance level (e.g., mission critical traffic), it can be difficult to ensure that the priority traffic is delivered with high assurance while allowing other scale-saturating traffic to propagate in the same system. Thus, in order to support delivery of priority IoT traffic, a high-priority delivery mechanism for different IoT messages is needed in order to support mission-critical IoT services, while at the same time supporting high-scale resource-saturating traffic on the same system, e.g., an IoT gateway collocated in a Wi-Fi access point.

In some embodiments, this problem is address using the communication techniques to provide traffic shaping based on device/application category. Notably, there may be: a priority queuing mechanism with absolute priority delivery for high-priority messages; and/or a set of rules to detect message types and device categories related to these messages to identify high versus low priority messages.

For example, the access point may implement adaptive queuing to send (or receive) some beacons or other traffic packets rapidly or slowly, while sending (or receiving) other traffic with high or low priority. Notably, the access point may shape traffic based on volume, priority, or device/service category on a system of connected radios. Thus, in the IoT gateways there may be: a system of network-access providing radio devices that each may have or may use a multi-protocol-aware communication management module (which may distributed across a coordinator, a router central, a concentrator gateway and/or an access point and connected via a controller element); and/or a communication management technique that arbitrates transmission of packets on multiple radio transports based on traffic patterns, device type/category connected to the gateway device, an end-destination of the traffic, and/or by application use-case parameters. These parameters may be driven by a device-profile data structure that may include device-characteristic information, such as traffic/telemetry patterns, user-driven priority attributes, etc.

Moreover, in some embodiments, when a gateway receives beacons and/or connected-session attribute packets, there are two types of beacon applications (e.g., mission-critical slow and non-mission-critical fast) and two IoT devices are active (e.g., using BLE and Zigbee at the same time), a categorizing traffic shaper may maintain a priority-receive queue in which beacon application 1 and IoT-device attribute packets go into a high-priority receive queue, while beacon application 2 go into a low-priority receive queue. Furthermore, connectivity of the beacon services may be selected among multiple gateway devices for maximum signal strength, while the lower-priority beacon application traffic may be diverted to more distant gateways to ensure priority of the higher-priority beacon application traffic.

The communication techniques may ensure that, even when massive BLE beacon-traffic takes an IoT gateway to its scale limit, an on/off message to turn a light on/off may still be reliably and timely delivered to a lamp. Therefore, the end-user experience may be close to using a mechanic on-off switch in spite of the massive BLE beacon traffic served at the same time on the same system. Similarly, when a multi-gateway option of the solution is in use, mission-critical signaling may be moved to a gateway closer or closest to the end device, thereby reducing the risk of a lost service-assurance level because of poor link quality occurring if the IoT end device is too far from the IoT gateway. Thus, the communication techniques may ensure that mission critical signaling with service assurance can be maintained while serving other traffic at scale limit, and mission critical traffic can be diverted to nodes with a better-performing radio link.

In some embodiments, there may be two queues or communication channels with low and high-priority delivery, e.g., two MQTT topics, one for low priority and other for assured-delivery high priority. The communication techniques may be used to identify messages based on a set of rules to be either low or high priority messages. For example, the set of rules may be that any rule in the set that may designate a message to be of high priority, while others messages are low priority. Alternatively, the set of rules may be that a match designates a message to be of low priority and the others messages to be of high priority. For example, in some embodiments BLE beacon messages may be considered low priority and other messages may be considered high priority.

Note that low priority messages may be delivered to the low-priority MQTT topic and high-priority messages may be delivered to the high-priority MQTT topic. These channels can then end-to-end extend to their destinations through the IoT system in order to maintain end-to-end service assurance.

In some embodiments, the set of rules may be dynamically adapted and/or an administrator may add new rules or may modify one or more of the existing rules. For example, a static rule may determine whether a message identified as a BLE beacon is low priority. Then, there may be a technique or mechanism for estimating that a message is a BLE beacon if it is received from a BLE interface. This technique or mechanism may identify destinations that consume BLE beacons as a candidate for new dynamically learned rule when these endpoints accept the message as a valid BLE beacon (e.g., using vendor REST API feedback, in which a vendor service indicates that the message was accepted as a valid BLE beacon). The result may then be passed to a rule cache, which marks the rule as successfully learned or that removes or marks it as a false rule if this proposed rule was not successful.

Moreover, horizontal prioritization may happen with messages that can be received from e.g., multiple gateways (such as certain BLE beacons), so that a path with an improved or the best RSSI may be marked as primary path and where a high-priority message may be queued to a high-priority MQTT channel. This approach may have an option of performing parallel or with all receiving endpoints for added redundancy. Alternatively or additionally, if a high-priority message is of a connected nature and can be received from one endpoint at a time (such as when there is one connected Zigbee device in one personal area network at a time), the communication techniques can decide to move the electronic device to an improved-RSSI personal area network if the communication protocol support allows for mobility (e.g., when the underlying IoT protocol supports disconnecting from a poorer-performing endpoint and diverting to an improved-signal endpoint).

Using the communication techniques, it may be possible to prioritize, to learn whether new message categories are of low or high priority, and to distribute or move message flows to improved-endpoint connections between an end electronic device or destination and one or more alternate gateways. These capabilities may improve message-delivery assurance for mission-critical services.

We now describe embodiments of an electronic device, which may perform at least some of the operations in the communication techniques. FIG. 10 presents a block diagram illustrating an example of an electronic device 1000 in accordance with some embodiments, such as one of access points 110, electronic devices 112, services manager 114 or computers 116. This electronic device includes processing subsystem 1010, memory subsystem 1012, and networking subsystem 1014. Processing subsystem 1010 includes one or more devices configured to perform computational operations. For example, processing subsystem 1010 can include one or more microprocessors, ASICs, microcontrollers, programmable-logic devices, one or more graphics processing units, and/or one or more digital signal processors (DSPs).

Memory subsystem 1012 includes one or more devices for storing data and/or instructions for processing subsystem 1010 and networking subsystem 1014. For example, memory subsystem 1012 can include dynamic random access memory (DRAM), static random access memory (SRAM), and/or other types of memory. In some embodiments, instructions for processing subsystem 1010 in memory subsystem 1012 include: one or more program modules or sets of instructions (such as program instructions 1022 or operating system 1024), which may be executed by processing subsystem 1010. Note that the one or more computer programs or program instructions may constitute a computer-program mechanism. Moreover, instructions in the various modules in memory subsystem 1012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1010.

In addition, memory subsystem 1012 can include mechanisms for controlling access to the memory. In some embodiments, memory subsystem 1012 includes a memory hierarchy that comprises one or more caches coupled to a memory in electronic device 1000. In some of these embodiments, one or more of the caches is located in processing subsystem 1010.

In some embodiments, memory subsystem 1012 is coupled to one or more high-capacity mass-storage devices (not shown). For example, memory subsystem 1012 can be coupled to a magnetic or optical drive, a solid-state drive, or another type of mass-storage device. In these embodiments, memory subsystem 1012 can be used by electronic device 1000 as fast-access storage for often-used data, while the mass-storage device is used to store less frequently used data.

Networking subsystem 1014 includes one or more devices configured to couple to and communicate on a wired and/or wireless network (i.e., to perform network operations), including: control logic 1016, an interface circuit 1018, an optional cable 1006 and one or more antennas 1020 (or antenna elements), which may be included in an optional antenna module 1030. (While FIG. 10 includes antenna module 1030, in some embodiments electronic device 1000 includes one or more nodes, such as nodes 1008, e.g., a pad, which can be coupled to antenna module 1030. Thus, electronic device 1000 may or may not include antenna modules 1030. Note that the one or more nodes 1008 may constitute input(s) to and/or output(s) from electronic device 1000.) For example, networking subsystem 1014 can include a Bluetooth™ networking system, a BLE networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a Zigbee networking system, a Z-Wave networking system, a LoRaWAN networking system and/or another networking system.

Note that a transmit or receive antenna pattern (or antenna radiation pattern) of electronic device 1000 may be adapted or changed using pattern shapers (such as reflectors) in one or more antennas 1020 (or antenna elements), which can be independently and selectively electrically coupled to ground to steer the transmit antenna pattern in different directions. Thus, if one or more antennas 1020 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1000 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1000 may use the mechanisms in networking subsystem 1014 for performing simple wireless communication between the electronic devices, e.g., transmitting advertising or beacon frames and/or scanning for advertising frames transmitted by other electronic devices as described previously.

Within electronic device 1000, processing subsystem 1010, memory subsystem 1012, and networking subsystem 1014 are coupled together using bus 1028. Bus 1028 may include an electrical, optical, and/or electro-optical connection that the subsystems can use to communicate commands and data among one another. Although only one bus 1028 is shown for clarity, different embodiments can include a different number or configuration of electrical, optical, and/ or electro-optical connections among the subsystems.

In some embodiments, electronic device 1000 includes a display subsystem 1026 for displaying information on a display, which may include a display driver and the display, such as a liquid-crystal display, a multi-touch touchscreen, etc.

Electronic device 1000 can be (or can be included in) any electronic device with at least one network interface. For example, electronic device 1000 can be (or can be included in): an IoT device, a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a controller, test equipment, and/or another electronic device.

Although specific components are used to describe electronic device 1000, in alternative embodiments, different components and/or subsystems may be present in electronic device 1000. For example, electronic device 1000 may include one or more additional processing subsystems, memory subsystems, networking subsystems, and/or display subsystems. Additionally, one or more of the subsystems may not be present in electronic device 1000. Moreover, in some embodiments, electronic device 1000 may include one or more additional subsystems that are not shown in FIG. 10. Also, although separate subsystems are shown in FIG. 10, in some embodiments some or all of a given subsystem or component can be integrated into one or more of the other subsystems or component(s) in electronic device 1000. For example, in some embodiments program instructions 1022 is included in operating system 1024 and/or control logic 1016 is included in interface circuit 1018.

Moreover, the circuits and components in electronic device 1000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1014. The integrated circuit may include hardware and/or software mechanisms that are used for transmitting wireless signals from electronic device 1000 and receiving signals at electronic device 1000 from other electronic devices. Aside from the mechanisms herein described, radios are generally known in the art and hence are not described in detail. In general, networking subsystem 1014 and/or the integrated circuit can include any number of radios. Note that the radios in multiple-radio embodiments function in a similar way to the described single-radio embodiments.

In some embodiments, networking subsystem 1014 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used BLE, Ethernet, MQTT and a Wi-Fi communication protocols as illustrative examples, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1022, operating system 1024 (such as a driver for interface circuit 1018) or in firmware in interface circuit 1018. Note that the communication techniques may occur while processing system 1010 executes program instructions 1022. Thus, the communication techniques may be implemented at runtime of program instructions 1022. Alternatively or additionally, at least some of the operations in the communication techniques may be implemented in a physical layer, such as hardware in interface circuit 1018.

Moreover, while the preceding discussion illustrated embodiments of the communication techniques in which an access point transmits to or receives a frame or a packet from an electronic device, in some embodiments the access point may concurrently transmit to or receive frames or packets from two or more electronic devices. For example, the communication protocol in a WLAN may use orthogonal frequency division multiple access (OFDMA).

Furthermore, the functionality of electronic device 1000 may be implemented using a single electronic device or a group of electronic devices, which may be located at a single location or which may be distributed at disparate geographic locations (such as a cloud-based computing system).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   one or more antenna nodes configured to couple to one or more antennas; and
   an interface circuit communicatively coupled to the one or more antenna nodes, and wherein the electronic device is configured to:
   receive, from the interface circuit, one or more packets or frames associated with a second electronic device using a communication protocol;
   determine device-specific information based at least in part on a device profile associated with the communication protocol, a communication history of the second electronic device, or both; and assign data traffic associated with the second electronic device to a queue in a set of queues based on the determined device-specific information, wherein queues in the set of queues have different priorities, and wherein the queue provides a predefined upper bound on latency of communication with the second electronic device corresponding to a priority of the queue, and the predefined upper bound on latency is associated with a type of application corresponding to the data traffic and is not based on the data traffic assigned to the queue.

2. The electronic device of claim 1, wherein the device-specific information comprises: a type of the second electronic device, a type of service associated with the second electronic device, whether the second electronic device is battery powered or whether the second electronic device has a wake-up time interval.

3. The electronic device of claim 1, wherein the device-specific information comprises a priority associated with data traffic to or from the second electronic device.

4. The electronic device of claim 1, wherein the communication protocol comprises Zigbee and the device profile comprises a Zigbee cluster library or a vendor-specific electronic-device attribute.

5. The electronic device of claim 1, wherein the communication protocol comprises Bluetooth Low Energy (BLE) and the device profile comprises a BLE generic attribute (GATT) profile.

6. The electronic device of claim 1, wherein the electronic device is configured to:

provide a request for the device-specific information intended for a third electronic device associated with a third party based at least in part on the communication protocol; and receive the device-specific information associated with the third electronic device.

7. The electronic device of claim 6, wherein the device-specific information is requested from the third electronic device when the second electronic device communicates using a communication protocol that is compatible with an IEEE 802.11 standard.

8. The electronic device of claim 1, wherein the communication history comprises a frequency of communication with the second electronic device; and wherein, when the frequency is less than a threshold value, the data traffic is assigned to the queue having the predefined upper bound on latency and, when the frequency is greater than the threshold value, the data traffic is assigned to a second queue having a second predefined upper bound on latency that is less than the predefined upper bound on latency.

9. The electronic device of claim 1, wherein the determining comprises calculating a weighted summation of one or more parameters specified by the device-specific information.

10. The electronic device of claim 1, wherein, prior to determining the device-specific information, the electronic device is configured to perform a scan for any electronic devices in a wireless environment of the electronic device that are within wireless communication range of the electronic device.

11. A non-transitory computer-readable storage medium for use in conjunction with an electronic device, the computer-readable storage medium storing program instructions that, when executed by the electronic device, selectively provides prioritized communication by causing the electronic device to perform one or more operations comprising:

receiving one or more packets or frames associated with a second electronic device using a communication protocol;

determining device-specific information based at least in part on a device profile associated with the communication protocol, a communication history of the second electronic device, or both; and assigning data traffic associated with the second electronic device to a queue in a set of queues based on the determined device-specific information, wherein queues in the set of queues have different priorities, and wherein the queue provides a predefined upper bound on latency of communication with the second electronic device corresponding to a priority of the queue, and the predefined upper bound on latency is associated with a type of application corresponding to the data traffic and is not based on the data traffic assigned to the queue.

12. The non-transitory computer-readable storage medium of claim 11, wherein the device-specific information comprises: a type of the second electronic device, a type of service associated with the second electronic device, whether the second electronic device is battery powered or whether the second electronic device has a wake-up time interval.

13. The non-transitory computer-readable storage medium of claim 11, wherein the device-specific information comprises a priority associated with data traffic to or from the second electronic device.

14. The non-transitory computer-readable storage medium of claim 11, wherein the communication protocol comprises Zigbee and the device profile comprises a Zigbee cluster library or a vendor-specific electronic-device attribute.

15. The non-transitory computer-readable storage medium of claim 11, wherein the communication protocol comprises Bluetooth Low Energy (BLE) and the device profile comprises a BLE generic attribute (GATT) profile.

16. The non-transitory computer-readable storage medium of claim 11, wherein the one or more operations comprise:

providing a request for the device-specific information intended for a third electronic device associated with a third party based at least in part on the communication protocol; and receiving the device-specific information associated with the third electronic device.

17. The non-transitory computer-readable storage medium of claim 11, wherein the communication history comprises a frequency of communication with the second electronic device; and wherein, when the frequency is less than a threshold value, the data traffic is assigned to the queue having the predefined upper bound on latency and, when the frequency is greater than the threshold value, the data traffic is assigned to a second queue having a second predefined upper bound on latency that is less than the predefined upper bound on latency.

18. The non-transitory computer-readable storage medium of claim 11, wherein the determining comprises calculating a weighted summation of one or more parameters specified by the device-specific information.

19. A method for selectively providing prioritized communication, comprising:

by an electronic device:

receiving one or more packets or frames associated with a second electronic device using a communication protocol;

determining device-specific information based at least in part on a device profile associated with the communication protocol, a communication history of the second electronic device, or both; and assigning data traffic associated with the second electronic device to a queue in a set of queues based on the determined device-specific information, wherein queues in the set of queues have different priorities, and wherein the queue provides a predefined upper bound on latency of communication with the second electronic device corresponding to a priority of the queue, and the predefined upper bound on latency is associated with a type of application corresponding to the data traffic and is not based on the data traffic assigned to the queue.

20. The method of claim 19, wherein the communication history comprises a frequency of communication with the second electronic device; and wherein, when the frequency is less than a threshold value, the data traffic is assigned to the queue having the predefined upper bound on latency and, when the frequency is greater than the threshold value, the data traffic is assigned to a second queue having a second predefined upper bound on latency that is less than the predefined upper bound on latency.

* * * * *